United States Patent
Son et al.

(10) Patent No.: US 11,505,726 B2
(45) Date of Patent: Nov. 22, 2022

(54) OPTICAL LAMINATE

(71) Applicant: SHANJIN OPTOELECTRONICS (SUZHOU) CO., LTD., Zhangjiagang (CN)

(72) Inventors: Hyun Hee Son, Daejeon (KR); Seul Ki Han, Daejeon (KR); Dong Hun Lee, Daejeon (KR)

(73) Assignee: SHANJIN OPTOELECTRONICS (SUZHOU) CO., LTD., Zhangjiagang (CN)

( * ) Notice: Subject to any disclaimer, the term of this patent is extended or adjusted under 35 U.S.C. 154(b) by 330 days.

(21) Appl. No.: 16/641,903

(22) PCT Filed: Sep. 12, 2018

(86) PCT No.: PCT/KR2018/010690
§ 371 (c)(1),
(2) Date: Feb. 25, 2020

(87) PCT Pub. No.: WO2019/054751
PCT Pub. Date: Mar. 21, 2019

(65) Prior Publication Data
US 2020/0199418 A1    Jun. 25, 2020

(30) Foreign Application Priority Data
Sep. 13, 2017   (KR) ........................ 10-2017-0117008

(51) Int. Cl.
| | |
|---|---|
| *C09J 133/08* | (2006.01) |
| *C09J 7/20* | (2018.01) |
| *G02B 5/30* | (2006.01) |

(52) U.S. Cl.
CPC ............... *C09J 133/08* (2013.01); *C09J 7/20* (2018.01); *G02B 5/3033* (2013.01)

(58) Field of Classification Search
None
See application file for complete search history.

(56) References Cited

U.S. PATENT DOCUMENTS

| | | |
|---|---|---|
| 2005/0285286 A1 | 12/2005 | Shuto et al. |
| 2010/0016592 A1 | 1/2010 | Kim et al. |
| 2011/0111140 A1 | 5/2011 | Jang et al. |
| 2013/0005915 A1 | 1/2013 | Suzuki et al. |

FOREIGN PATENT DOCUMENTS

| | | |
|---|---|---|
| JP | 2006047978 A | 2/2006 |
| JP | 2013166846 A | 8/2013 |
| JP | 2014152317 A | 8/2014 |
| JP | 2017110074 A | 6/2017 |
| KR | 20060048693 A | 5/2006 |
| KR | 20080069355 A | 7/2008 |
| KR | 20100003689 A | 1/2010 |
| KR | 100960731 B1 | 5/2010 |
| KR | 20120121860 A | 11/2012 |
| KR | 20120124394 A | 11/2012 |
| KR | 101584840 B1 | 1/2016 |
| TW | 200600845 A | 1/2006 |
| TW | 201726869 A | 8/2017 |
| WO | 2017104349 A1 | 6/2017 |

OTHER PUBLICATIONS

International Search Report from Application No. PCT/KR2018/010690 dated Dec. 19, 2018, 3 pages.
Taiwanese Search Report for Application No. TW 107132137 dated Apr. 22, 2019, 1 page.

*Primary Examiner* — Ramsey Zacharia
(74) *Attorney, Agent, or Firm* — Schmeiser, Olsen & Watts, LLP

(57) ABSTRACT

An optical laminate is provided, wherein stable durability is secured even at a high temperature, particularly an ultra-high temperature of about 100° C. or more, other physical properties required for the optical laminate are also excellent, and even in the case of being disposed adjacent to the electrode, corrosion of the relevant electrode or the like is not induced.

18 Claims, No Drawings

OPTICAL LAMINATE

CROSS REFERENCE TO RELATED APPLICATIONS

The present application is a national stage entry under 35 U.S.C. § 371 of International Application No. PCT/KR2018/010690 filed on Sep. 12, 2018, which claims priority to Korean Patent Application No. 10-2017-0117008 filed on Sep. 13, 2017, the disclosures of which are incorporated herein by reference in their entirety.

TECHNICAL FIELD

The present application relates to an optical laminate.

BACKGROUND ART

Various optical films such as a polarizing plate are applied to various display devices such as an LCD (liquid crystal display) or an OLED (organic light emitting diode). Such an optical film is generally attached to a display device by a pressure-sensitive adhesive.

As applications of the display device are expanded, high reliability is required for the optical film and the pressure-sensitive adhesive. For example, optical films and pressure-sensitive adhesives used in navigation or automotive displays, and the like are required to stably maintain their performance even when they are kept at a very high temperature for a long period of time.

DISCLOSURE

Technical Problem

The present application relates to an optical laminate.

Technical Solution

The optical laminate of the present application comprises an optical film and a pressure-sensitive adhesive layer formed on one side or both sides of the optical film. If necessary, a release film may be formed on the pressure-sensitive adhesive layer formed on one side or both sides of the optical film. The pressure-sensitive adhesive layer may further comprise a pressure-sensitive adhesive polymer including an alkyl (meth)acrylate having an alkyl group with 4 or more carbon atoms, an alkyl (meth)acrylate unit having an alkyl group with 3 or less carbon atoms, an aromatic group-containing monomer unit, and a polar functional group-containing monomer unit. The alkyl (meth)acrylate unit having an alkyl group with 3 or less carbon atoms is in the pressure-sensitive adhesive polymer in an amount of 30 to 65 parts by weight relative to 100 parts by weight of the alkyl (meth)acrylate unit having an alkyl group with 4 or more carbon atoms, and the pressure-sensitive adhesive layer has 90 degree room-temperature peel force of 700 gf/25 mm or more on a glass substrate measured at a peel rate of 300 mm/min, and a gel fraction of 70 wt % or more, according to Equation 1 below:

$$\text{Gel fraction} = B/A \times 100 \quad \text{[Equation 1]}$$

wherein, A is the mass (unit:g) of the pressure-sensitive adhesive layer before immersing it in ethyl acetate, and B represents the dry mass (unit:g) of the insoluble fraction recovered after immersing the pressure-sensitive adhesive layer in ethyl acetate at room temperature for 24 hours.

The type of the optical film included in the optical laminate of the present application is not particularly limited, and various types used in various display devices may be included. For example, the optical film may be exemplified by a polarizing plate, a polarizer, a polarizer protective film, a retardation film, a viewing angle compensation film or a luminance enhancement film, and the like. In this specification, the term polarizer and polarizing plate refers to subjects that are distinguished from each other. The polarizer refers to a film, sheet or element itself exhibiting a polarization function, and the polarizing plate means an optical element including other elements together with the polarizer. Other elements that can be included in the optical element together with the polarizer can be exemplified by a polarizer protective film or a retardation layer, and the like, but is not limited thereto.

Basically, the polarizer that can be included in the optical film of the present application is not particularly limited. For example, when the optical film isa polarizer, a polyvinyl alcohol polarizer can be used. The polyvinyl alcohol polarize may contain a potassium component and zinc component. The term polyvinyl alcohol polarizer may mean, for example, a resin film of polyvinyl alcohol (hereinafter, may be referred to as PVA) series containing an anisotropic absorbent material such as iodine or a dichroic dye. Such a film can be produced by incorporating an anisotropic absorbent material into a polyvinyl alcohol-based resin film and orienting it by stretching or the like. Here, the polyvinyl alcohol-based resin may include polyvinyl alcohol, polyvinyl formal, polyvinyl acetal or a saponified product of ethylene-vinyl acetate copolymer, and the like. The degree of polymerization of the polyvinyl alcohol-based resin may be 100 to 5,000 or 1,400 to 4,000 or so, but is not limited thereto.

Such a polyvinyl alcohol polarizer can be produced, for example, by performing at least a dyeing process, a crosslinking process and a stretching process on a PVA-based film. In the dyeing step, the crosslinking step and the stretching step, respective treating baths of a dyeing bath, a crosslinking bath and a stretching bath are used, where these respective treating baths can be used by a treating solution according to each process.

In the dyeing process, the anisotropic absorbent material can be adsorbed and/or oriented on the PVA-based film. Such a dyeing process can be performed together with the stretching process. The dyeing can be performed by immersing the film in a solution containing an anisotropic absorbent material, for example, an iodine solution. As the iodine solution, for example, an aqueous solution or the like containing iodine, and iodine ions by an iodinated compound as a dissolution aid may be used. As the iodinate compound, for example, potassium iodide, lithium iodide, sodium iodide, zinc iodide, aluminum iodide, lead iodide, copper iodide, barium iodide, calcium iodide, tin iodide or titanium iodide, and the like may be used. The concentration of iodine and/or iodine ions in the iodine solution can be adjusted in consideration of the desired optical characteristics of the polarizer, and such an adjustment method is known. In the dyeing process, the temperature of the iodine solution is usually 20° C. to 50° C. or 25° C. to 40° C. or so, and the immersion time is usually 10 seconds to 300 seconds or 20 seconds to 240 seconds or so, but is not limited thereto.

The crosslinking process performed during the production process of the polarizer can be performed, for example, using a crosslinking agent such as a boron compound. The order of the crosslinking process is not particularly limited, which can be performed, for example, together with the dyeing and/or drawing process or can proceed separately. The crosslinking process may also be performed several times. As the boron compound, boric acid or borax, and the like may be used. The boron compound can be generally used in the form of an aqueous solution or a mixed solution of water and an organic solvent, and usually an aqueous solution of boric acid is used. The boric acid concentration in the boric acid aqueous solution can be selected in an appropriate range in consideration of the degree of crosslinking and the resulting heat resistance, and the like. The iodinated compound such as potassium iodide can also be contained in an aqueous boric acid solution or the like.

The crosslinking process can be performed by immersing the PVA-based film in an aqueous boric acid solution or the like, where in this process, the treatment temperature is usually in a range of 25° C. or higher, 30° C. to 85° C. or 30° C. to 60° C. or so and the treatment time is usually 5 seconds to 800 seconds or 8 seconds to 500 seconds or so.

The stretching process is generally performed by uniaxial stretching. Such stretching may also be performed together with the dyeing and/or crosslinking process. The stretching method is not particularly limited, and for example, a wet stretching method can be applied. In such a wet stretching method, for example, stretching after dyeing is generally performed, but stretching may be performed with crosslinking, and may also be performed several times or in multiple stages.

The iodinated compound such as potassium iodide can be contained in the treatment liquid applied to the wet stretching method, and in this process, a light blocking rate can also be controlled through adjusting the ratio. In the stretching, the treatment temperature is usually in the range of 25° C. or higher, 30° C. to 85° C. or 50° C. to 70° C., and the treatment time is usually 10 seconds to 800 seconds or 30 seconds to 500 seconds, without being limited thereto.

In the stretching process, the total draw ratio can be controlled in consideration of orientation characteristics and the like, and the total draw ratio may be 3 times to 10 times, 4 times to 8 times or 5 times to 7 times or so based on the original length of the PVA-based film, but is not limited thereto. Here, in the case of involving stretching a swelling process or the like other than the stretching process, the total draw ratio may mean the cumulative draw ratio including the stretching in each process. Such a total draw ratio can be adjusted to an appropriate range in consideration of orientation characteristics, processability or stretching cuttability of the polarizer, and the like.

In the production process of the polarizer, in addition to the dyeing, crosslinking and stretching, the swelling process may also be performed before performing the above process. The contamination of the surface of the PVA-based film or an antiblocking agent can be cleaned by swelling, whereby there is also an effect capable of reducing unevenness such as dyeing deviations.

In the swelling process, water, distilled water or pure water, and the like can be usually used. The main component of the relevant treatment liquid is water, and if necessary, an iodinated compound such as potassium iodide or an additive such as a surfactant, or an alcohol, and the like can be included in a small amount. In this process, the above-described light blocking rate can also be controlled through control of process variables.

The treatment temperature in the swelling process is usually 20° C. to 45° C. or 20° C. to 40° C. or so, but is not limited thereto. Since swelling deviations can cause dyeing deviations, process variables can be adjusted so that the occurrence of such swelling deviations is suppressed as much as possible.

If necessary, appropriate stretching can also be performed in the swelling process. The draw ratio may be 6.5 times or less, 1.2 to 6.5 times, 2 times to 4 times, or 2 times to 3 times, based on the original length of the PVA-based film. The stretching in the swelling process can control the stretching in the stretching process performed after the swelling process to be small, and it can control so that the stretching failure of the film does not occur.

In the production process of the polarizer, metal ion treatment can be performed. This treatment is performed, for example, by immersing the PVA-based film in an aqueous solution containing a metal salt. This allows metal ions to be contained in the polarizer, and in this process, the color tone of the PVA-based polarizer can be controlled by controlling the kind or ratio of metal ions. The applicable metal ions can be exemplified by metal ions of a transition metal such as cobalt, nickel, zinc, chromium, aluminum, copper, manganese or iron, and it may be possible to control the color tone by selecting an appropriate type of these.

In the production process of the polarizer, the cleaning process may proceed after dyeing, crosslinking and stretching. This cleaning process can be performed by a solution of an iodinated compound such as potassium iodide, and in this process, the above-described light blocking rate can be controlled through the concentration of the iodinated compound in the solution or the treatment time of the cleaning process, and the like. Therefore, the concentration of the iodinated compound and the treatment time with the solution can be adjusted in consideration of the light blocking rate. However, the cleaning process may also be performed using water.

Such cleaning with water and cleaning with the iodinated compound solution may also be combined, or a solution in which a liquid alcohol such as methanol, ethanol, isopropyl alcohol, butanol or propanol is blended may also be used.

After these processes, the polarizer can be produced by performing a drying process. The drying process can be performed at an appropriate temperature for an appropriate time, for example, in consideration of the moisture content and the like required for the polarizer, where such conditions are not particularly limited.

In one example, as the polarizer, a polyvinyl alcohol polarizer comprising a potassium component such as potassium ions and a zinc component such as zinc ions may be used for securing durability, particularly high temperature reliability, of the optical laminate. If the polarizer containing such components is used, it is possible to provide an optical laminate in which durability is stably maintained even under high temperature conditions, particularly ultra-high temperature conditions of 100° C. or more.

The ratio of the potassium and zinc components can be further controlled. For example, in one example, the ratio (K/Zn) of the potassium component (K) to the zinc component (Zn) contained in the polyvinyl alcohol polarizer may be in a range of 0.2 to 20. In another example, the ratio (K/Zn) may be about 0.4 or more, 0.6 or more, 0.8 or more, 1 or more, 1.5 or more, 2 or more, or 2.5 or more, and may be 19.5 or less, 19 or less, 18.5 or less, 18 or less, 17.5 or less, 17 or less, 16.5 or less, 16 or less, 15.5 or less, 15 or less, 14.5 or less, 14 or less, 13.5 or less, 13 or less, 12.5 or less, 12 or less, 11.5 or less, 11 or less, 10.5 or less, 10 or less, 9.5 or less, 9 or less, 8.5 or less, 8 or less, 7.5 or less, 7 or less, 6.5 or less, 6 or less, 5.5 or less, about 5 or less, about 4.5 or less, or about 4 or less. The ratio (K/Zn) of the potassium component (K) to the zinc component (Zn) contained in the polyvinyl alcohol polarizer may mean parts by weight.

In addition, the ratio of the potassium component contained in the polyvinyl alcohol polarizer may be about 0.1 to 2 wt %. In another example, the ratio of the potassium component may be about 0.15 wt % or more, about 0.2 wt % or more, about 0.25 wt % or more, about 0.3 wt % or more, about 0.35 wt % or more, 0.4 wt % or more, or about 0.45 wt % or more, and may be about 1.95 wt % or less, about 1.9 wt % or less, about 1.85 wt % or less, about 1.8 wt % or less, about 1.75 wt % or less, about 1.7 wt % or less, about 1.65 wt % or less, about 1.6 wt % or less, about 1.55 wt % or less, about 1.5 wt % or less, about 1.45 wt % or less, about 1.4 wt % or less, about 1.35 wt % or less, about 1.3 wt % or less, about 1.25 wt % or less, about 1.2 wt % or less, about 1.15 wt % or less, about 1.1 wt % or less, about 1.05 wt % or less, about 1 wt % or less, about 0.95 wt % or less, about 0.9 wt % or less, or about 0.85 wt % or less or so.

In one example, the ratio of the potassium component to the zinc component may be included so as to satisfy Equation A below.

$$0.70 \text{ to } 0.95 = 1/(1+QXd/R) \quad \text{Equation [A]}$$

In Equation A, Q is the ratio (K/Zn) of the molar mass (K, 39.098 g/mol) of the potassium component and the molar mass (Zn, 65.39 g/mol) contained in the polyvinyl alcohol polarizer, d is the thickness (μm)/60 μm of the polyvinyl alcohol polarizer before stretching, R is the ratio (K/Zn) of the weight ratio (K, unit:weight %) of the potassium component and the weight ratio (Zn, unit:weight %) of the zinc component contained in the polyvinyl alcohol polarizer.

By comprising potassium and zinc components in a polarizer in the above manner, it is possible to provide a polarizer having excellent reliability at a high temperature.

The thickness of such a polarizer is not particularly limited, where the polarizer may be formed to have an appropriate thickness depending on the purpose. Typically, the thickness of the polarizer may be in a range of 5 μm to 80 μm, but is not limited thereto.

The optical laminate of the present application comprises a pressure-sensitive adhesive layer formed on one side or both sides of the optical film. Such a pressure-sensitive adhesive layer comprises a pressure-sensitive adhesive polymer. The pressure-sensitive adhesive layer may comprise the pressure-sensitive adhesive polymer as a main component. That is, the content ratio of the pressure-sensitive adhesive polymer relative to the total weight of the pressure-sensitive adhesive layer may be 55 wt % or more, 60 wt % or more, 65 wt % or more, 70 wt % or more, 75 wt % or more, 80 wt % or more, 85 wt % or more, or 90 wt % or more. The upper limit of the ratio is not particularly limited, which may be, for example, about 98 wt % or less, or 95 wt % or less. Such a pressure-sensitive adhesive polymer may be contained in the pressure-sensitive adhesive layer in a state of being crosslinked by a crosslinking agent as described below.

As the pressure-sensitive adhesive polymer, a polymer having a weight average molecular weight (Mw) of 500,000 or more can be used. In the present application, the term "weight average molecular weight" is a numerical value in terms of standard polystyrene measured by GPC (gel permeation chromatograph), which may also be simply referred to as molecular weight, unless otherwise specified. In another example, the molecular weight (Mw) may be about 600,000 or more, about 700,000 or more, about 800,000 or more, about 900,000 or more, about 1,000,000 or more, about 1,100,000 or more, about 1,200,000 or more, about 1,300,000 or more, about 1,400,000 or more, or about 1,500,000 or more, or may be about 3,000,000 or less, about 2,800,000 or less, about 2,600,000 or less, about 2,400,000 or less, about 2,200,000 or less, or about 2,000,000 or less.

The pressure-sensitive adhesive polymer may be an acrylic pressure-sensitive adhesive polymer. The term acrylic adhesive polymer may mean, as one having a property capable of forming a pressure-sensitive adhesive, a polymer comprising an acrylic monomer unit as a main component. The term acrylic monomer may mean acrylic acid, methacrylic acid or a derivative of acrylic acid or methacrylic acid such as (meth)acrylic acid ester. Here, the phrase being included as a main component may also mean a case where the ratio of the relevant component is 55% or more, 60% or more, 65% or more, 70% or more, 75% or more, 80% or more, 85% or more, 90% or more, or 95% or more on the basis of weight. The upper limit of the ratio may be 100%. In addition, the unit contained in the polymer means a state where the monomer forms a main chain and/or a side chain of the polymer through a polymerization reaction.

The pressure-sensitive adhesive polymer comprises (1) an alkyl (meth)acrylate unit having an alkyl group having 4 or more carbon atoms, (2) an alkyl (meth)acrylate unit having an alkyl group having 3 or less carbon atoms, (3) an aromatic group-containing monomer unit and (4) a polar functional group-containing monomer unit. In addition, the unit (2) is contained in the pressure-sensitive adhesive polymer in a ratio of about 30 to 65 parts by weight relative to 100 parts by weight of the unit (1). In another example, the ratio may be about 60 parts by weight or less, or 58 parts by weight or less.

Such a monomer composition is associated with physical properties of a pressure-sensitive adhesive layer, which are described below, such as gel fraction and peel force, so that the pressure-sensitive adhesive layer can excellently maintain re-workability, cutting ability, lifting and foam inhibiting ability, and the like as well as represent excellent high temperature durability.

Here, as the unit (1), an alkyl (meth)acrylate unit having an alkyl group with 4 or more carbon atoms, for example, an alkyl group with 4 to 14 carbon atoms can be used in consideration of cohesive force, glass transition temperature or adhesion of the pressure-sensitive adhesive, and the like. Such an alkyl (meth)acrylate can be exemplified by n-butyl (meth)acrylate, t-butyl (meth)acrylate, sec-butyl (meth) acrylate, pentyl (meth)acrylate, 2-ethylhexyl (meth)acrylate, 2-ethylbutyl (meth)acrylate, n-octyl (meth)acrylate, isooctyl (meth)acrylate, isooctyl (meth)acrylate, lauryl (meth)acrylate and tetradecyl (meth)acrylate, and the like, and one or two or more of the foregoing can be applied. Generally, n-butyl acrylate or 2-ethylhexyl acrylate, and the like are used.

The ratio of the unit (1) in the polymer is not particularly limited, but may be in a range of about 50 to 70 wt %. In another example, the ratio may be about 65 wt % or less.

As the unit (2), an alkyl (meth)acrylate unit having an alkyl group with 3 or less carbon atoms is used. Such a unit makes it possible that the pressure-sensitive adhesive ensures good endurance reliability at a high temperature. The monomer capable of forming the unit can be exemplified by methyl (meth)acrylate, ethyl (meth)acrylate, n-propyl (meth)acrylate or isopropyl (meth)acrylate, and the like, and a suitable example is methyl acrylate.

As the unit (3), a unit of an aromatic group-containing monomer, for example, a unit of a (meth)acrylate-based monomer having an aryl group is used.

The kind of the aromatic group-containing monomer capable of forming such a unit is not particularly limited, and for example, a monomer of Formula 1 below can be exemplified.

[Formula 1]

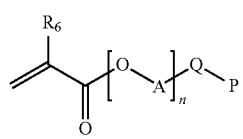

In Formula 1, $R_6$ represents hydrogen or an alkyl group, A represents an alkylene group, n represents an integer in a range of 0 to 3, Q represents a single bond, —O—, —S— or an alkylene group, and P represents an aryl group.

In Formula 1, a single bond means a case where the atomic groups on both sides are directly bonded to each other without mediating a separate atom.

In Formula 1, $R_6$ may be, for example, hydrogen or alkyl of 1 to 4 carbon atoms, or may be hydrogen, methyl or ethyl.

In the definition of Formula 1, A may be alkylene of 1 to 12 carbon atoms or 1 to 8 carbon atoms, and for example, may be methylene, ethylene, hexylene or octylene.

In Formula 1, n may be, for example, a number in the range of 0 to 2, or may be 0 or 1.

In Formula 1, Q may be a single bond, —O— or —S—.

In Formula 1, P is an aryl group, that is, a substituent derived from an aromatic compound, which may be, for example, a functional group derived from an aromatic ring having 6 to 20 carbon atoms, for example, phenyl, biphenyl, naphthyl or anthracenyl.

In Formula 1, the aryl group may be optionally substituted by one or more substituents, where a specific example of the substituent may include halogen or alkyl, or halogen or alkyl of 1 to 12 carbon atoms, or chlorine, bromine, methyl, ethyl, propyl, butyl, nonyl or dodecyl, but is not limited thereto.

A specific example of the compound of Formula 1 may include one or a mixture of two or more of phenoxyethyl (meth)acrylate, benzyl (meth)acrylate, 2-phenylthio-1-ethyl (meth)acrylate, 6-(4,6-dibromo-2-isopropylphenoxy)-1-hexyl (meth)acrylate, 6-(4,6-dibromo-2-sec-butylphenoxy)-1-hexyl (meth)acrylate, 2,6-dibromo-4-nonylphenyl (meth)acrylate, 2,6-dibromo-4-dodecylphenyl (meth)acrylate, 2-(1-naphthyloxy)-1-ethyl (meth)acrylate, 2-(2-naphthyloxy)-1-ethyl (meth)acrylate, 6-(1-naphthyloxy)-1-hexyl (meth)acrylate, 6-(2-naphthyloxy)-1-hexyl (meth)acrylate, 8-(1-naphthyloxy)-1-octyl (meth)acrylate and 8-(2-naphthyloxy)-1-octyl (meth)acrylate, but is not limited thereto.

The unit (3) may be included in the pressure-sensitive adhesive polymer in a ratio of about 20 to 45 parts by weight relative to 100 parts by weight of the unit (1). In another example, the ratio may be about 40 parts by weight or less, about 35 parts by weight or less, or about 30 parts by weight or less.

As the unit (4), a unit of a monomer having a hydroxyl group or a carboxyl group as a polar functional group may be used. Such a unit may serve to impart cohesive force or the like through a reaction with a cross-linking agent or the like, which is described below, if necessary. As the monomer having a polar functional group, hydroxyalkyl (meth)acrylate having a hydroxyalkyl group having a carbon number of the alkyl group in a range of 3 to 6 or a carboxyl group-containing monomer may be used for ensuring adequate high temperature reliability and the like.

The hydroxyalkyl (meth)acrylate having a hydroxyalkyl group having a carbon atom of the alkyl group in the range of 3 to 6 can be exemplified by 3-hydroxypropyl (meth)acrylate, 4-hydroxybutyl (meth)acrylate or 6-hydroxyhexyl (meth)acrylate, and the like, and in one example, 4-hydroxybutyl (meth)acrylate can be used.

The carboxyl group-containing monomer can be exemplified by (meth)acrylic acid, 2-(meth)acryloyloxyacetic acid, 3-(meth)acryloyloxypropyl acid, 4-(meth)acryloyloxybutyric acid, an acrylic acid dimer, itaconic acid, maleic acid and maleic anhydride, and the like, and generally, acrylic acid can be applied.

However, in the case where the pressure-sensitive adhesive layer is used adjacent to an electrode such as ITO (indium tin oxide), if a large amount of carboxyl groups are contained in the pressure-sensitive adhesive layer, they may cause corrosion of the electrode to adversely affect the performance of the device, so that a component having a carboxyl group may not be applied, or it may be necessary to limit the application ratio.

The unit (4) may be included in the pressure-sensitive adhesive polymer in a ratio of about 1 to 4.5 parts by weight relative to 100 parts by weight of the unit (1). In another example, the ratio may be about 1.5 parts by weight or more, or may be about 4 parts by weight or less, or about 3.5 parts by weight or less. In particular, when the unit (4) is a carboxyl group-containing monomer unit, the ratio may be about 1 part by weight or more, or about 1.5 parts by weight or more, or may be about 4.5 parts by weight or less, about 4 parts by weight or less, about 3.5 parts by weight or less, about 3 parts by weight or less, about 2.5 parts by weight or less, or about 2 parts by weight or less, relative to 100 parts by weight of the unit (1).

As the pressure-sensitive adhesive polymer contains the above-mentioned monomer units and, if necessary, the ratio thereof is adjusted, stable durability at a high temperature is ensured in the pressure-sensitive adhesive layer and other physical properties required for the pressure-sensitive adhesive layer are also stably maintained, where even in the case of being disposed adjacent to the electrode, corrosion of the relevant electrode or the like cannot be caused. Particularly, the above-described effect can be maximized within the content range of the unit (2). On the other hand, when the content of the unit (2) is less than the above range, there is a problem that an adherend is lifted in a high temperature condition due to low attachment force. In addition, when the content of the unit (2) exceeds the above range, the adhesion between the pressure-sensitive adhesive layer and the adherend decreases, and thus the pressure-sensitive adhesive flows out during cutting and processing the optical laminate, so that there is a problem that the optical laminate is contaminated.

The pressure-sensitive adhesive polymer may further comprise other known units in addition to the above-mentioned units, if necessary.

Such a pressure-sensitive adhesive polymer may be prepared by a known polymerization method applying the above-mentioned monomers.

The pressure-sensitive adhesive layer may further comprise a crosslinking agent, where the crosslinking agent may crosslink the pressure-sensitive adhesive polymer.

As the crosslinking agent, a known crosslinking agent may be used without any particular limitation, and for example, an isocyanate crosslinking agent, an epoxy crosslinking agent, an aziridine crosslinking agent and a metal chelating crosslinking agent, and the like may be used.

As the isocyanate crosslinking agent, a diisocyanate such as tolylene diisocyanate, xylene diisocyanate, diphenylmethane diisocyanate, hexamethylene diisocyanate, isophorone diisocyanate, tetramethylxylene diisocyanate or naphthalene diisocyanate, or a reaction product of one or more of the diisocyanates with a polyol (e.g., trimethylol propane), and the like can be used.

As the epoxy crosslinking agent, one or more selected from the group consisting of ethylene glycol diglycidyl ether, triglycidyl ether, trimethylolpropane triglycidyl ether, N,N,N,N'-tetraglycidylethylenediamine and glycerin diglycidyl ether can be used; as the aziridine crosslinking agent, one or more selected from the group consisting of N,N-toluene-2,4-bis(1-aziridinecarboxamide), N,N'-diphenylmethane-4,4'-bis(1-aziridinecarboxamide), triethylenemelamine, bisisophthaloyl-1-(2-methylaziridine) and tri-1-aziridinylphosphine oxide can be used; and as the metal chelating crosslinking agent, a compound in which a polyvalent metal such as aluminum, iron, zinc, tin, titanium, antimony, magnesium and/or vanadium is coordinated to acetylacetone or ethyl acetoacetate, and the like can be used, without being limited thereto.

The crosslinking agent can be used in an amount of 0.001 parts by weight to 10 parts by weight relative to 100 parts by weight of the pressure-sensitive adhesive polymer, specifically 100 parts by weight of the solid content of the adhesive polymer, and under this ratio, it is possible to prevent deterioration of endurance reliability such as occurrence of interlayer peeling or a lifting phenomenon, and the like, while appropriately maintaining cohesive force of the pressure-sensitive adhesive.

In another example, the ratio may be about 0.005 part by weight or more, 0.01 part by weight or more, 0.05 part by weight or more, or 0.1 part by weight or more, and may be about 9 parts by weight or less, 8 parts by weight or less, 7 parts by weight or less, 6 parts by weight or less, 5 parts by weight or less, 4 parts by weight or less, 3 parts by weight or less, 2 parts by weight or less, or 1.5 parts by weight or less.

The pressure-sensitive adhesive layer may further contain an ionic compound. In addition, the ionic compound can make the pressure-sensitive adhesive layer have appropriate antistatic properties.

As the ionic compound, an inorganic salt or an ionic liquid may be used. In the present application, the term ionic liquid may mean an ionic compound present in a liquid state at room temperature. Here, the room temperature is a natural temperature without warming or cooling, which may mean a temperature of about 10° C. to 30° C., about 15° C. to 30° C., about 20° C. to 30° C., about 25° C. or about 23° C. or so.

When an inorganic salt is applied as the ionic compound, as the inorganic salt, a salt containing an alkali metal cation or an alkaline earth metal cation can be used. Such a cation can be exemplified by one or two or more of a lithium ion ($Li^{30}$), a sodium ion ($Na^+$), a potassium ion ($K^+$), a rubidium ion ($Rb^+$), a cesium ion ($Cs^+$), a beryllium ion ($Be^{2+}$), a magnesium ion ($Mg^{2+}$), a calcium ion ($Ca^{2+}$), a strontium ion ($Sr^{2+}$) and a barium ion ($Ba^{2+}$), and the like, and for example, one or two or more of a lithium ion, a sodium ion, a potassium ion, a magnesium ion, a calcium ion and a barium ion or a lithium ion, in consideration of ionic stability and mobility, can be used.

On the other hand, as the ionic liquid, a compound having an onium salt including nitrogen, sulfur or phosphorus as a cation component can be used. Such a cation can be exemplified by a quaternary ammonium compound such as N-ethyl-N,N-dimethyl-N-propylammonium, N,N,N-trimethyl-N-propylammonium, N-methyl-N,N,N-tributylammonium, N-ethyl-N,N,N-tributylammonium, N-methyl-N,N,N-trihexylammonium, N-ethyl-N,N,N-trihexylammonium, N-methyl-N,N,N-trioctylammonium or N-ethyl-N,N,N-trioctylammonium, phosphonium or a derivative thereof such as tetraalkylphosphonium, pyridinium or a derivative thereof, tetrahydropyridinium or a derivative thereof, dihydropyridinium or a derivative thereof, imidazolium or a derivative thereof, a compound containing a pyrroline skeleton or a derivative thereof, a compound containing a pyrrole skeleton or a derivative thereof, imidazolinium or a derivative thereof such as 1-ethyl-3-methylimidazolinium, pyrazolinium or a derivative thereof, trialkylsulfonium or a derivative thereof, pyrrolidinium or a derivative thereof such as 1-methyl-1-propylpyrrolidinium or a derivative thereof, or piperidinum or a derivative thereof such as 1-methyl-1-propyl piperidinium, and the like. In the present application, a compound containing a cation in which an alkyl group contained in the cation is substituted with an alkoxy group, a hydroxyl group, an alkynyl group or an epoxy group, and the like, among the above-mentioned cations, may also be used.

In one example, as the cation of the ionic liquid, a cation represented by Formula A below may be applied.

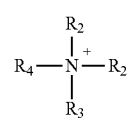

[Formula A]

In Formula A, $R_1$ to $R_4$ each independently represent hydrogen, alkyl, alkoxy, alkenyl or alkynyl.

In Formula A, the alkyl or alkoxy may be alkyl or alkoxy having 1 to 20 carbon atoms, 1 to 12 carbon atoms, 1 to 8 carbon atoms or 1 to 4 carbon atoms. In addition, the alkyl or alkoxy may be linear, branched or cyclic alkyl or alkoxy, which may optionally be substituted by one or more substituents.

In Formula A, the alkenyl or alkynyl may be alkenyl or alkynyl having 2 to 20 carbon atoms, 2 to 12 carbon atoms, 2 to 8 carbon atoms or 2 to 4 carbon atoms. In addition, the alkenyl or alkynyl may be linear, branched or cyclic alkenyl or alkynyl, which may be optionally substituted by one or more substituents.

In the definitions of Formula A, when the alkyl, alkoxy, alkenyl or alkynyl is substituted with one or more substituents, an example of the substituent may include hydroxy, alkyl, alkoxy, alkenyl, alkynyl, cyano, thiol, amino, aryl or heteroaryl, and the like, but is not limited thereto.

In one example, $R_1$ to $R_4$ of Formula A may be each independently alkyl, and for example, linear or branched alkyl having 1 to 12 carbon atoms. In Formula A, $R_1$ to $R_4$ each independently represent linear or branched alkyl having 1 to 12 carbon atoms, but $R_1$ to $R_4$ may not simultaneously correspond to alkyl having the same carbon number. In this case, the case where $R_1$ to $R_4$ are all alkyl groups having the same carbon number is excluded in the range of Formula A. When $R_1$ to $R_4$ are all alkyl having the same carbon number, the probability that the compound exists in a solid phase at room temperature can be increased.

In Formula A, $R_1$ may be alkyl having 1 to 3 carbon atoms, and $R_2$ to $R_4$ may be each independently alkyl having 4 to 20 carbon atoms, 4 to 15 carbon atoms or 4 to 10 carbon atoms. By using such a cation, it is possible to provide a pressure-sensitive adhesive which has more excellent optical properties, pressure-sensitive adhesive properties, workability and antistatic properties, has increased adhesion to a substrate, and has a shorter time required for stabilization of physical properties such as curing.

The anion contained in the ionic compound may be exemplified by $PF_6^-$, $AsF^-$, $NO_2$, fluoride ($F^-$), chloride ($Cl^-$), bromide ($Br^-$), iodide (L), perchlorate ($ClO_4^-$), hydroxide ($OH^-$), carbonate ($CO_3^{2-}$), nitrate ($NO_3^-$), trifluoromethanesulfonate ($CF_3SO_3^-$), sulfonate ($SO_4^-$), hexafluorophosphate ($PF_6^-$), methylbenzenesulfonate ($CH_3(C_6H_4)SO_3^-$), p-tolunesulfonate ($CH_3C_6H_4SO_3$), tetraborate ($B_4O_7^{2-}$), carboxybenzenesulfonate ($COOH(C_6H_4)SO_3^-$), trifluoromethanesulfonate ($CF_3SO_2$), benzoate ($C_6H_5COO^-$), acetate ($CH_3COO^-$), trifluoroacetate ($CF_3COO^-$), tetrafluoroborate ($BF_4^-$), tetrabenzylborate ($B(C_6H_5)_4^-$) or trispentafluoroethyl trifluorophosphate ($P(C_2F_5)_3F_3^-$), and the like.

In another example, as the anion, an anion represented by Formula B or bifluorosulfonylimide, and the like, can also be used.

$$[X(YO_mR_f)_n]^-$$ [Equation B]

In Formula B, X is a nitrogen atom or a carbon atom, Y is a carbon atom or a sulfur atom, $R_f$ is a perfluoroalkyl group, m is 1 or 2, and n is 2 or 3.

In Formula B, when Y is carbon, m may be 1; when Y is sulfur, m may be 2; when X is nitrogen, n may be 2; and when X is carbon, n may be 3.

The anion of Formula B or bis(fluorosulfonyl)imide exhibits high electronegativity due to the perfluoroalkyl group ($R_f$) or the fluorine group, and also contains a unique resonance structure to have hydrophobicity while forming a weak bond with the cation. Accordingly, the ionic compound can exhibit excellent compatibility with other components, such as a polymer, of the composition, as well as give high antistatic property even in a small amount.

$R_f$ in Formula B may be a perfluoroalkyl group having 1 to 20 carbon atoms, 1 to 12 carbon atoms, 1 to 8 carbon atoms or 1 to 4 carbon atoms, where the perfluoroalkyl group may have a linear, branched or cyclic structure. The anion of Formula B may be a sulfonylmethide-based, sulfonylimide-based, carbonylmethide-based or carbonylimide-based anion, and specifically, may be one or a mixture of two or more of tristrifluoromethanesulfonylmethide, bistrifluoromethanesulfonylimide, bisperfluorobutanesulfonylimide, bispentafluoroethanesulfonylimide, tristrifluoromethanecarbonylmethide, bisperfluorobutanesulfonylimide or bispentafluoroethanecarbonylimide, and the like.

The ionic compound may be present in the pressure-sensitive adhesive layer in a ratio of 0.01 to 15 parts by weight relative to 100 parts by weight of the pressure-sensitive adhesive polymer. Specifically, the ionic compound may be present in the pressure-sensitive adhesive layer in a ratio of 0.1 parts by weight or more, 0.5 parts by weight or more, 1 part by weight or more, or 1.5 parts by weight or more and may be present in a ratio of 10 parts by weight or less, 5 parts by weight or less, 2 parts by weight or less, or 1.5 parts by weight or less, relative to 100 parts by weight of the solid content of the pressure-sensitive adhesive polymer. Under such a ratio, while desired antistatic properties are ensured, other required properties such as adhesion with the optical film can be stably maintained.

The pressure-sensitive adhesive layer may further comprise other known additives as needed, in addition to the above-mentioned components. Such an additive can be exemplified by one or more selected from the group consisting of a coupling agent such as a silane coupling agent; an antistatic agent; a tackifier; an ultraviolet stabilizer; an antioxidant; a colorant; a reinforcing agent; a filler; a defoamer; a surfactant; a photopolymerizable compound such as a multifunctional acrylate; and a plasticizer, but is not limited thereto.

Such a pressure-sensitive adhesive layer can be adjusted to exhibit a predetermined gel fraction at the same time while exhibiting peel force in a specific range.

For example, the pressure-sensitive adhesive layer may have room temperature peel force of about 700 gf/25 mm or more as measured on a glass substrate at a peel rate of 300 mm/min and a peel angle of 90 degrees. The peel force may be about 750 gf/25 mm or more, about 800 gf/25 mm or more, about 850 gf/25 mm or more, about 900 gf/25 mm or more, or about 950 gf/25 mm. The upper limit of the peel force is not particularly limited, and for example, the peel force may be about 2,000 gf/25 mm or less, about 1,800 gf/25 mm or less, or about 1,500 gf/25 mm or less.

In the present application, the term room temperature is a natural temperature without warming or cooling, which may mean, for example, any one temperature in a range of about 10° C. to 30° C., or a temperature of about 25° C. or 23° C. or so.

In addition, among physical properties mentioned in this specification, when the measured temperature affects the physical properties, the relevant physical properties means physical properties measured at room temperature, unless otherwise specified.

Furthermore, the pressure-sensitive adhesive layer may exhibit a gel fraction in a predetermined range. For example, the pressure-sensitive adhesive layer may have a gel fraction of about 70 wt % or more as calculated by Equation 1 below.

$$\text{Gel fraction} = B/A \times 100 \quad [\text{Equation 1}]$$

In Equation 1, A is the mass (unit:g) of the pressure-sensitive adhesive layer before immersing it in ethyl acetate, and B represents the dry mass (unit:g) of the insoluble fraction recovered after immersing the pressure-sensitive adhesive layer in ethyl acetate at room temperature for 24 hours. At this time, the insoluble fraction means a component which is filtered through a 200 mesh sieve, and the dry mass of the insoluble fraction means a mass measured in a state where the solvent is not substantially contained in the relevant insoluble fraction by drying the collected insoluble fraction under an appropriate condition, for example, in a state where a solvent content is about 1 wt % or less, 0.5 wt % or less, or 0.1 wt % or less. Here, the drying condition is not particularly limited as long as the ratio of the solvent contained in the insoluble fraction can be controlled within the above range, and it can be performed under an appropriate condition.

In another example, the gel fraction may be about 75 wt % or more, or 80 wt % or more, and may also be about 95 wt % or less, 90 wt % or less, or about 85 wt % or less.

The gel fraction depends on the molecular weight or the degree of crosslinking of the pressure-sensitive adhesive polymer used in the pressure-sensitive adhesive, and the like, and an appropriate range can be achieved in view of this.

The pressure-sensitive adhesive layer may also have a room temperature storage elastic modulus of about 0.06 MPa or more. In another example, the elastic modulus may be 0.065 MPa or more, 0.07 MPa or more, 0.075 MPa or more, 0.08 MPa or more, 0.085 MPa or more, 0.09 MPa or more, or 0.095 MPa or more, and may be 0.2 MPa or less, 0.15 MPa or less, or 0.12 MPa or less. The elastic modulus of the pressure-sensitive adhesive layer is also controlled by the molecular weight or composition of the polymer, the ratio of the cross-linking agent, the degree of cross-linking, and the like, and an appropriate range can be set in view of this.

One or two or more of the above-mentioned physical properties may be associated with the composition of the above-mentioned polymer and the like to enable the formation of the intended pressure-sensitive adhesive layer in the present application.

The optical laminate of the present application may further comprise a protective film. The protective film may be attached to the optical film via the above-described pressure-sensitive adhesive layer. The kind of the usable protective film is not particularly limited, where a usual film known in this field, for example, a polymer film such as triacetyl cellulose (TAC), polyethylene terephthalate (PET) can be used.

The present application also relates to a display device comprising such an optical laminate. The device may comprise, for example, a display panel to which the optical laminate is attached via the above-mentioned pressure-sensitive adhesive layer. Here, the type of the display panel is not particularly limited, which may be, for example, a known LCD panel or OLED panel, and the like. Furthermore, the position or the like where the optical laminate is attached to the panel can also follow a known manner.

Advantageous Effects

The present application relates to an optical laminate. The present application can provide an optical laminate that stable durability is secured even at a high temperature, particularly an ultra-high temperature of about 100° C. or more, other physical properties required for the optical laminate are also excellent, and even in the case of being disposed adjacent to the electrode, corrosion of the relevant electrode or the like is not induced.

MODE FOR INVENTION

Hereinafter, the present application will be specifically described by way of examples, but the scope of the present application is not limited by the following examples.

1. Method of Measuring Peel Force

The pressure-sensitive adhesive polarizing plates prepared in Examples or Comparative Examples were each cut to a width of 25 mm and a height of 200 mm to prepare a specimen, which was attached to a glass plate via the pressure-sensitive adhesive layer of the specimen. The peel force at room temperature was measured while peeling off the pressure-sensitive adhesive polarizing plate at a peel angle of 90 and a peel rate of 300 mm/min at an elapsed time of 1 hour after attachment of the specimen.

2. Method of Measuring Gel Fraction

After holding each of the pressure-sensitive adhesive layers prepared in Examples or Comparative Examples at a constant temperature and humidity room (23° C., 50% relative humidity) for 7 days, 0.2 g (=A in gel fraction measurement equation) was collected. The collected pressure-sensitive adhesive layer was completely immersed in 50 mL of ethyl acetate, and then stored in a dark room at room temperature for 1 day. Subsequently, a portion (insoluble fraction) not dissolved in ethyl acetate was collected in a #200 stainless steel wire net and dried at 150° C. for 30 minutes to measure the mass (dry mass of insoluble fraction=B in gel fraction measurement equation). Subsequently, the gel fraction (unit: %) was measured by substituting the measurement result into the following equation.

<Gel Fraction Measurement Equation>

$$\text{Gel fraction} = B/A \times 100$$

A: mass of the pressure-sensitive adhesive (0.2 g)
B: dry mass of insoluble fraction (unit:g)

3. Method of Measuring Elastic Modulus

The pressure-sensitive adhesive compositions prepared in Examples or Comparative Examples were each coated between two release films and aged for 7 days under a constant temperature and humidity condition (23° C., 50% relative humidity) to prepare a pressure-sensitive adhesive layer having a thickness of about 22 μm. Subsequently, the pressure-sensitive adhesive between the release films was cut to prepare a circumferential specimen of 8 mm×1 mm (=diameter×thickness), and then using a dynamic rheometer (ARES, RDA, TA Instruments Inc.), the storage elastic modulus at 23° C. was measured while applying shear stress between parallel plates at a frequency of 1 Hz.

4. ITO Corrosion Test

The pressure-sensitive adhesive compositions prepared in Examples or Comparative Examples were each laminated on a TAC (triacetyl cellulose) film having a thickness of 40 μm and aged for 7 days under a constant temperature and humidity condition (23° C., 50% relative humidity) to prepare a pressure-sensitive adhesive layer. A typical ITO (indium tin oxide) film was cut to have a width of about 50 mm or so and a height of about 30 mm or so to prepare a specimen, on which a silver paste was applied to both ends in the transverse direction at a width of 10 mm or so, respectively. Subsequently, the pressure-sensitive adhesive layer was cut to have a width of about 40 mm or so and a height of about 30 mm or so, and attached to the ends on the silver paste at an interval of 5 mm or so to prepare the specimen. The prepared ITO (indium tin oxide) film was stored for 250 hours under a high temperature and humidity condition (85° C., 85% relative humidity), and then the change rate of resistance was evaluated with a linear resistance meter (Hioki 3244-60 card hitester) as compared with before initial introduction.

5. High Temperature Durability

The pressure-sensitive adhesive polarizing plates of Examples or Comparative Examples were each cut to have a width of about 140 mm or so and a height of about 90 mm or so to prepare a specimen, which was attached to a glass substrate at a pressure of 5 kg/cm². The attachment was performed in a clean room so that bubbles or foreign materials were not generated. Subsequently, the prepared sample was kept in an autoclave for 15 minutes under conditions of 50° C. and 5 kg/cm².

After maintaining the sample at a temperature of about 100° C. for about 500 hours, the durability was evaluated according to the following criteria.

<Evaluation Criteria>

○: no bubbling and peeling occurred
Δ: bubbling and/or peeling occurred
X: severe bubbling and/or peeling occurred 6. Method of Measuring Weight Average Molecular Weight The weight average molecular weight of the pressure-sensitive adhesive polymers prepared in Preparation Examples was measured using gel permeation chromatography (GPC) under the following conditions. For the production of the calibration curve, the measurement results were converted using standard polystyrene of the Agilent system.

Meter: Agilent GPC (Agilent 1200 series, USA)
Column: two PL Mixed B combined
Column temperature: 40° C.
Eluent: THF (tetrahydrofuran)
Flow rate: 1.0 mL/min
Concentration: ~2 mg/mL (100 μL injection)

7. Evaluation of Pressure-Sensitive Adhesive Missing

The pressure-sensitive adhesive layers prepared in Examples are each laminated on the prepared polarizer, aged for about 7 days under a constant temperature and humidity condition of a temperature of 23° C. and relative humidity of 50 RH %, and cut to a size of 200 mm×200 mm (width×height) to prepare a polarizing plate specimen.

A pressure-sensitive adhesive tape for evaluation having a width of about 50 mm is attached on one side of the pressure-sensitive adhesive layer of the specimen, and the pressure-sensitive adhesive tape for evaluation is laminated on the specimen by applying a pressure of 5 kg/cm² thereto. Then, after the adhesive tape for evaluation was detached from the specimen of the adhesive polarizing plate, the residual degree of the pressure-sensitive adhesive layer remaining on the surface of the polarizer was visually evaluated on the basis of the following criteria.

<Evaluation Criteria of Pressure-Sensitive Adhesive Missing>

○: the case where the number of vacancies having a diameter of 1 mm or less, which are observed at the polarizer surface as the pressure-sensitive adhesive layer is peeled off from the surface of the polarizer, is 5 or less Δ: the case where the number of vacancies having a diameter of 1 mm or less, which are observed at the polarizer surface as the pressure-sensitive adhesive layer is peeled off from the surface of the polarizer, exceeds 5

X: the case where the total area of vacancies having a diameter of 1 mm or less, which are observed at the polarizer surface as the pressure-sensitive adhesive layer is peeled off from the surface of the polarizer, is larger than the area of the remaining pressure-sensitive adhesive layer 8. Evaluation of Surface Resistance The pressure-sensitive adhesive polarizing plates prepared in Examples and Comparative Examples were each cut to a size of 50 mm×50 mm (width×height) to prepare a surface resistance evaluation specimen. The surface resistance of the pressure-sensitive adhesive layer of the specimen was measured by applying a voltage of 500 V for 10 seconds in a constant temperature and humidity atmosphere of a temperature of 23° C. and relative humidity of 50 RH % using a resistivity meter (Mitsubishi Chemical Analytech, Hiresta-ux (MCP-HT800 Type)).

PREPARATION EXAMPLE 1

Preparation of Pressure-Sensitive Adhesive Polymer (A)

n-Butyl acrylate (n-BA), benzyl acrylate (BzA), methyl acrylate (MA) and hydroxybutyl acrylate (4-HBA) were introduced into an 1 L reactor equipped with a cooling device for nitrogen gas refluxing and easy temperature control in a weight ratio of 64:15:20:1 (n-BA: BzA: MA: 4-HBA) and 100 parts by weight of ethyl acetate (EAc) was introduced as a solvent. Subsequently, nitrogen gas was purged for 1 hour to remove oxygen, and then, 0.03 parts by weight of azobisisobutyronitrile (AIBN) diluted to a concentration of 50 wt % in ethyl acetate was introduced as a reaction initiator and reacted for 8 hours to prepare a pressure-sensitive adhesive polymer (A) as a copolymer having a molecular weight (Mw) of about 1,900,000 or so.

PREPARATION EXAMPLE 2

Preparation of Pressure-Sensitive Adhesive Polymers B to I

Copolymers were prepared in the same manner as in Preparation Example 1, except that the compositions shown in Tables 1 and 2 below were adopted.

TABLE 1

| | Preparation Example | | | | |
|---|---|---|---|---|---|
| | 1 | 2 | 3 | 4 | 5 |
| | A | B | C | D | E |
| n-BA | 64 | 54 | 63 | 64 | 54 |
| BzA | 15 | 15 | 15 | 15 | 15 |
| MA | 20 | 30 | 20 | 20 | 30 |
| 4-HBA | 1 | 1 | 2 | | |
| AA | | | | 1 | 1 |
| Mw | 1,800,000 | 1,850,000 | 1,800,000 | 1,650,000 | 1,860,000 |

Content unit: part by weight,
n-BA: n-butyl acrylate,
BzA: benzyl acrylate,
MA: methyl acrylate,
4-HBA: 4-hydroxybutyl acrylate,
AA: acrylic acid,
Mw: weight average molecular weight

TABLE 2

| | Preparation Example | | | |
|---|---|---|---|---|
| | 6 | 7 | 8 | 9 |
| | F | G | H | I |
| n-BA | 84 | 84 | 81 | 44 |
| BzA | 15 | 15 | 15 | 15 |
| MA | | | | 40 |
| 4-HBA | | 1 | | |
| AA | 1 | | 4 | 1 |
| Mw | 1,650,000 | 1,500,000 | 1,300,000 | 1,860,000 |

Content unit: part by weight,
n-BA: n-butylacrylate,
BzA: benzyl acrylate,
MA: methyl acrylate,
4-HBA: 4-hydroxybutyl acrylate,
AA: acrylic acid,
Mw: weight average molecular weight

EXAMPLE 1

Preparation of Pressure-Sensitive Adhesive Composition ad Pressure-Sensitive Adhesive Layer An isocyanate crosslinking agent (T-39M, Japan Soken Co., Ltd.) was combined to the copolymer (A) of Preparation Example 1 in an amount of about 0.08 parts by weight relative to 100 parts by weight of the solid content of the copolymer (A) and an ionic liquid (FC-4400, 3M Co.) was combined thereto in an amount of about 1.5 parts by weight relative to 100 parts by weight of the solid content of the copolymer (A), and the mixture was diluted to an appropriate concentration and uniformly mixed to prepare a pressure-sensitive adhesive composition. Then, the pressure-sensitive adhesive composition was coated on a release paper and dried to produce a uniform pressure-sensitive adhesive layer having a thickness of 22 μm.

Production of Polarizer

A polyvinyl alcohol (PVA) film (Japan Synthetic Co., M2004) having a thickness of about 60 μs immersed in a dyeing solution at 30° C. containing 0.05 wt % of iodine and 1.5 wt % of potassium iodide for 60 seconds to be subjected to dyeing. Subsequently, the dyed polyvinyl alcohol film was immersed in a crosslinking solution at 30° C. containing 0.5 wt % of boron and 3.0 wt % of potassium iodide for 60 seconds to be subjected to crosslinking. Thereafter, the crosslinked polyvinyl alcohol film was stretched at a draw ratio of 5.5 times using a roll-to-roll stretching method. The stretched polyvinyl alcohol film was washed with water by immersing it in ion-exchanged water at 30° C. for 20 seconds and immersed in a solution at 30° C. containing 2.0 wt % of zinc nitrate and 5.5 wt % of potassium iodide for 10 seconds. Thereafter, the polyvinyl alcohol film was dried at a temperature of 80° C. for 200 seconds to produce a polarizer. The potassium content in the produced polarizer was about 0.8 wt %, and the zinc content was about 0.17 wt %.

Production of Optical Laminate (Pressure-Sensitive Adhesive Polarizing Plate)

The produced pressure-sensitive adhesive layer was attached to one side of the polarizing plate to produce a pressure-sensitive polarizing plate (optical laminate).

EXAMPLE 2

A pressure-sensitive adhesive composition, a pressure-sensitive adhesive layer and a pressure-sensitive adhesive polarizing plate were produced in the same manner as in Example 1, except that a crosslinking agent (T-39M, Japan Soken Co., Ltd.) was combined to the copolymer (A) of Preparation Example 1 in an amount of about 0.12 parts by weight relative to 100 parts by weight of the solid content of the copolymer (A).

EXAMPLE 3

A pressure-sensitive adhesive composition, a pressure-sensitive adhesive layer and a pressure-sensitive adhesive polarizing plate were produced in the same manner as in Example 1, except that a crosslinking agent (T-39M, Japan Soken Co., Ltd.) was combined to the copolymer (B) of Preparation Example 2 in an amount of about 0.12 parts by weight relative to 100 parts by weight of the solid content of the copolymer (B).

EXAMPLE 4

A pressure-sensitive adhesive composition, a pressure-sensitive adhesive layer and a pressure-sensitive adhesive polarizing plate were produced in the same manner as in Example 1, except that a crosslinking agent (T-39M, Japan Soken Co., Ltd.) was combined to the copolymer (C) of Preparation Example 3 in an amount of about 0.12 parts by weight relative to 100 parts by weight of the solid content of the copolymer (C).

EXAMPLE 5

A pressure-sensitive adhesive composition, a pressure-sensitive adhesive layer and a pressure-sensitive adhesive polarizing plate were produced in the same manner as in Example 1, except that an isocyanate crosslinking agent (T-706BB, Japan Soken Co., Ltd.) was combined to the copolymer (D) of Preparation Example 4 in an amount of about 1.0 parts by weight relative to 100 parts by weight of the solid content of the copolymer (D) and also an epoxy crosslinking agent (T-743L, Japan Soken Co., Ltd.) was combined thereto in an amount of about 0.005 parts by weight relative to 100 parts by weight of the solid content of the copolymer (D).

EXAMPLE 6

A pressure-sensitive adhesive composition, a pressure-sensitive adhesive layer and a pressure-sensitive adhesive polarizing plate were produced in the same manner as in Example 1, except that an isocyanate crosslinking agent (T-706BB, SOKEN) and an epoxy crosslinking agent (T-743L, SOKEN) were combined to the copolymer (E) of Preparation Example 5 in amounts of about 1.0 parts by weight and about 0.005 parts by weight, relative to 100 parts by weight of the solid content of the copolymer (E), respectively.

COMPARATIVE EXAMPLE 1

A pressure-sensitive adhesive composition, a pressure-sensitive adhesive layer and a pressure-sensitive adhesive polarizing plate were produced in the same manner as in Example 1, except that a toluene diisocyanate crosslinking agent (T-706BB, Japan Soken Co., Ltd.) was combined to the copolymer (F) of Preparation Example 6 in an amount of about 1.0 parts by weight relative to 100 parts by weight of the solid content of the copolymer (F), and also an epoxy crosslinking agent (T-743L, Japan Soken Co., Ltd.) was combined thereto in an amount of about 0.005 parts by weight relative to 100 parts by weight of the solid content of the copolymer (F).

COMPARATIVE EXAMPLE 2

A pressure-sensitive adhesive composition, a pressure-sensitive adhesive layer and a pressure-sensitive adhesive polarizing plate were produced in the same manner as in Example 1, except that a crosslinking agent (T-39M, Japan Soken Co., Ltd.) was combined to the copolymer (G) of Preparation Example 7 in an amount of about 0.08 parts by weight relative to 100 parts by weight of the solid content of the copolymer (G).

COMPARATIVE EXAMPLE 3

A pressure-sensitive adhesive composition, a pressure-sensitive adhesive layer and a pressure-sensitive adhesive polarizing plate were produced in the same manner as in Example 1, except that a crosslinking agent (toluene diisocyanate type, T-706BB, Japan Soken Co., Ltd.) was combined to the copolymer (H) of Preparation Example 8 in an amount of about 1.7 parts by weight relative to 100 parts by weight of the solid content of the copolymer (H) and also another crosslinking agent (epoxy crosslinking agnet, T-743L, Japan Soken Co., Ltd.) was combined thereto in an amount of about 0.005 parts by weight relative to 100 parts by weight of the solid content of the copolymer (H).

COMPARATIVE EXAMPLE 4

A pressure-sensitive adhesive composition, a pressure-sensitive adhesive layer and a pressure-sensitive adhesive polarizing plate were produced in the same manner as in Example 1, except that an isocyanate crosslinking agent (T-706BB, SOKEN) and an epoxy crosslinking agent (T-743L, SOKEN) were combined to the copolymer (I) of Preparation Example 9 in amounts of about 1.0 parts by weight and about 0.005 parts by weight, relative to 100 parts by weight of the solid content of the copolymer (I), respectively.

The evaluation results of Examples and Comparative Examples above were summarized and described in Tables 3 and 4 below.

TABLE 3

|  | Example | | | | | |
| --- | --- | --- | --- | --- | --- | --- |
|  | 1 | 2 | 3 | 4 | 5 | 6 |
| Peel force (gf/25 mm) | 900 | 850 | 1000 | 750 | 1000 | 1000 |
| Gel fraction (wt %) | 76 | 82 | 83 | 83 | 85 | 89 |
| Elastic modulus (Pa) | 63000 | 72000 | 90000 | 91000 | 105000 | 109000 |
| High temperature durability | Δ | ○ | ○ | ○ | ○ | ○ |
| ITO resistance change rate | 18% | 20% | 15% | 15% | 80% | 80% |
| Pressure-sensitive adhesive missing | Δ | ○ | Δ | ○ | ○ | ○ |
| Surface resistance (Ω/sq) | $10^{11}$ | $10^{11}$ | $10^{11}$ | $10^{11}$ | $10^{11}$ | $10^{11}$ |

TABLE 4

|  | Comparative Example | | | |
| --- | --- | --- | --- | --- |
|  | 1 | 2 | 3 | 4 |
| Peel force (gf/25 mm) | 700 | 500 | 900 | 1300 |
| Gel fraction (wt %) | 76 | 72 | 80 | 89 |
| Elastic modulus (Pa) | 80000 | 44000 | 88000 | 122000 |
| High temperature durability | X | X | ○ | ○ |
| ITO resistance change rate | 85% | 20% | 350% | 80% |
| Pressure-sensitive adhesive missing | ○ | ○ | X | Δ |
| Surface resistance (Ω/sq) | $10^{11}$ | $10^{11}$ | $10^{11}$ | $10^{12}$ |

The invention claimed is:

1. An optical laminate comprising:
   an optical film; and
   a pressure-sensitive adhesive layer formed on one side or on both sides of the optical film,
   wherein the pressure-sensitive adhesive layer comprises a pressure-sensitive adhesive polymer including an alkyl (meth)acrylate unit having an alkyl group with 4 or more carbon atoms, an alkyl (meth)acrylate unit having an alkyl group with 3 or less carbon atoms, an aromatic group-containing monomer unit, and a polar functional group-containing monomer unit that has a carboxyl group as a polar functional group,
   wherein the polar functional group-containing monomer unit is in the pressure-sensitive adhesive polymer in an amount of 1 to 4.5 parts by weight relative to 100 parts by weight of the alkyl (meth)acrylate unit having an alkyl group with 4 or more carbon atoms,
   the alkyl (meth)acrylate unit having an alkyl group with 3 or less carbon atoms is in the pressure-sensitive adhesive polymer in an amount of 30 to 65 parts by weight relative to 100 parts by weight of the alkyl (meth)acrylate unit having an alkyl group with 4 or more carbon atoms, and
   the pressure-sensitive adhesive layer has 90 degree room-temperature peel force of 700 gf/25 mm or more on a glass substrate measured at a peel rate of 300 mm/min, and a gel fraction of 70 wt % or more, according to Equation 1 below:

$$\text{Gel fraction} = B/A \times 100 \quad \text{[Equation 1]}$$

wherein, A is a mass (unit:g) of the pressure-sensitive adhesive layer before immersing the pressure-sensitive adhesive layer in ethyl acetate, and B represents a dry mass (unit:g) of an insoluble fraction recovered after immersing the pressure-sensitive adhesive layer in ethyl acetate at room temperature for 24 hours.

2. The optical laminate according to claim 1, wherein the optical film is a polarizer.

3. The optical laminate according to claim 1, wherein the optical film is a polyvinyl alcohol polarizer containing a potassium component and a zinc component.

4. The optical laminate according to claim 3, wherein a ratio (K/Zn) of the potassium (K) component to the zinc (Zn) component in the polyvinyl alcohol polarizer is in a range of 0.2 to 20 by weight.

5. The optical laminate according to claim 1, wherein a weight of the alkyl (meth)acrylate unit having an alkyl group with 4 or more carbon atoms in the pressure-sensitive adhesive polymer is in a range of 50 wt % to 70 wt % by weight of the pressure-sensitive adhesive polymer.

6. The optical laminate according to claim 1, wherein the alkyl (meth)acrylate unit having an alkyl group with 3 or less carbon atoms is a methyl acrylate unit.

7. The optical laminate according to claim 1, wherein the aromatic group containing monomer is represented by Formula 1 below:

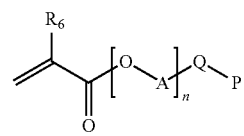

[Formula 1]

wherein, $R_6$ represents hydrogen or an alkyl group, A represents an alkylene group, n represents an integer in a range of 0 to 3, Q represents a single bond, —O—, —S— or an alkylene group, and P represents an aryl group.

8. The optical laminate according to claim 1, wherein the aromatic group-containing monomer unit is in the pressure-sensitive adhesive polymer in an amount of 20 to 45 parts by weight relative to 100 parts by weight of the alkyl (meth) acrylate unit having an alkyl group with 4 or more carbon atoms.

9. The optical laminate according to claim 1, wherein the polar functional group-containing monomer is hydroxyalkyl (meth)acrylate having an alkyl group with a carbon number in a range of 3 to 6 or a carboxyl group-containing monomer.

10. The optical laminate according to claim 1, wherein the pressure-sensitive adhesive layer has a room temperature storage elastic modulus of 0.06 MPa or more when measured at a temperature of 23° C.

11. The optical laminate according to claim 1, wherein the pressure-sensitive adhesive layer further comprises a crosslinking agent for crosslinking the pressure-sensitive adhesive polymer.

12. The optical laminate according to claim 1, wherein the pressure-sensitive adhesive layer further comprises an ionic compound.

13. The optical laminate according to claim 1, further comprising a release film attached to the pressure-sensitive adhesive layer.

14. A display device comprising a display panel to which the optical laminate of claim 1 is attached via the pressure-sensitive adhesive layer.

15. The optical laminate according to claim 1, wherein the 90 degree room-temperature peel force of the pressure-sensitive adhesive layer is from 700 gf/25 mm or more to 2,000 gf/25 mm or less on a glass substrate measured at the peel rate of 300 mm/min, and the gel fraction is from 70 wt % or more to 95 wt % or less, according to Equation 1.

16. The optical laminate according to claim 1, wherein the pressure-sensitive adhesive layer has a room temperature storage elastic modulus of 0.06 MPa or more to 0.2 MPa or less when measured at a temperature of 23° C.

17. The optical laminate according to claim 1, further comprising an electrode wherein the pressure-sensitive adhesive layer directly contacts the electrode.

18. An optical laminate comprising:
an optical film; and
a pressure-sensitive adhesive layer formed on one side or on both sides of the optical film,
wherein the pressure-sensitive adhesive layer comprises a pressure-sensitive adhesive polymer consisting of an alkyl (meth)acrylate unit having an alkyl group with 4 or more carbon atoms, an alkyl (meth)acrylate unit having an alkyl group with 3 or less carbon atoms, an aromatic group-containing monomer unit, a polar functional group-containing monomer unit that has a carboxyl group as a polar functional group, and an additive selected from a group consisting of a crosslinking agent for crosslinking the press-sensitive adhesive polymer, an ionic compound, and combinations thereof;
wherein the polar functional group-containing monomer unit is in the pressure-sensitive adhesive polymer in an amount of 1 to 4.5 parts by weight relative to 100 parts by weight of the alkyl (meth)acrylate unit having an alkyl group with 4 or more carbon atoms,
the alkyl (meth)acrylate unit having an alkyl group with 3 or less carbon atoms is in the pressure-sensitive adhesive polymer in an amount of 30 to 65 parts by weight relative to 100 parts by weight of the alkyl (meth)acrylate unit having an alkyl group with 4 or more carbon atoms, and
the pressure-sensitive adhesive layer has 90 degree room-temperature peel force of 700 gf/25 mm or more on a glass substrate measured at a peel rate of 300 mm/min, and a gel fraction of 70 wt % or more, according to Equation 1 below:

$$\text{Gel fraction} = B/A \times 100 \quad [\text{Equation 1}]$$

wherein, A is a mass (unit:g) of the pressure-sensitive adhesive layer before immersing the pressure-sensitive adhesive layer in ethyl acetate, and B represents a dry mass (unit:g) of an insoluble fraction recovered after immersing the pressure-sensitive adhesive layer in ethyl acetate at room temperature for 24 hours.

* * * * *